3,464,943
STABILIZING POLYOLEFINS WITH CERTAIN NICKEL AND HYDROXYBENZOTRIAZOLE COMPOUNDS

Gordon C. Newland, Kingsport, Tenn., and John W. Tamblyn, Jonas Ridge, N.C., assignors to Eastman Kodak Company, Rochester, N.Y., a corporation of New Jersey
No Drawing. Filed Sept. 28, 1967, Ser. No. 671,204
Int. Cl. C08f 45/56, 45/60
U.S. Cl. 260—23    4 Claims

ABSTRACT OF THE DISCLOSURE

The stabilization of polyolefins by admixing therewith certain hydroxybenzotriazoles and certain nickel compounds such as salts, hydroxide, oxide, and halides of nickel. The stabilized polyolefins are useful in fabricating various plastic articles such as films, coatings, fibers, and the like.

---

This invention relates to the use of synergistic combinations of certain nickel compounds and hydroxybenzotriazole compounds which are effective in the stabilization of poly-α-olefins against weathering and degradation induced by ultraviolet light.

Polyolefins, particularly polypropylene and copolymers thereof, have been found to exhibit poor resistance to long term weathering, as in resistance to long term exposure to ultraviolet radiation. Although the incorporation of ultraviolet stabilizers in polypropylene improves its resistance to degradation by ultraviolet light, it has been found in some cases that sufficient amounts of a given stabilizer cannot be used because of excessive cost, or incompatibility. According to the present invention, by using a combination of ingredients, some of which are inexpensive, excellent stabilization is obtained at relatively low cost. Since "weathering" is inclusive of other degradative agencies than ultraviolet radiation, weathering in its broader aspects, as well as desirable qualities of stabilizers for polyolefins, are discussed below.

The stabilizing and preservation agents useful in accordance with the invention prevent or minimize changes in the polymers caused or induced by one or more environmental factors such as climate and abnormal temperatures, visible and invisible wave energy, exposure to or the presence of deterioration-inducing or reactive materials and solvents for the compounded polymer or components thereof, and biological attack. Such changes fall within a number of areas. Thus, changes in flexural and tensile properties, strength properties in general, and the integrity of plastic bodies present a common problem. Changes in macromolecular structure and composition as well as changes in homogeneity of the compounded or raw polymer are also encountered. Appearance is not the least of the properties which may change, and this area includes color and surface characteristics, such as fading, crazing, cracking, and changes in hardness, such as embrittlement and softening.

"Weathering" is inclusive of many alterations which may take place, since exposure to the elements and air or polluted air involves temperature changes, exposure to moisture and biological attack, exposure to wave energy such as sunlight and ultraviolet light, contact with reactive materials in air such as sulfur oxides and other sulfur compounds, peroxides, oxygen, and ozone, and dissolution, leaching or exudation of compounding ingredients. As used herein, the term "weathering" is intended to denote exposure to such conditions which may result in such changes. One form of weathering is photochemical degradation of polymers when exposed to sunlight, particularly ultraviolet light, and air, which appears to be a photooxidation process causing rupture of the polymer chain, formation of carbonyl ($=C=O$) groups, or other changes. As this degradation progresses, the articles manufactured from these polymers, particularly those having thin cross sections, such as fibers and film, tend to crack, become brittle and lose tensile strength to the extent of mechanical failure.

Some changes may arise from polymer structure and impurities therein. Thus, unsaturation in the polymer and branching of the polymer provides potential sites for changes, such as crosslinking, depolymerization, or other changes, and impurities such as traces of metals or compounds thereof from catalyst residues and equipment corrosion may catalyze or otherwise induce alteration of the polymer.

Conditions inducing heat and oxygen degradation may be encountered in the utilization of the product in areas such as electrical insulation and during manufacturing processes utilizing the polymer. Thus, in milling, melt extruding, and in procedures such as compression molding, rolling, pressure deforming, calendering, or compounding of the polymer, high temepratures and exposure to air are commonly encountered and may result in heat and oxygen degradation of the polymer.

It is common knowledge in the art that stabilizers known to be useful for one material, polymer or plastic may or may not be useful in another environment, that is, for another material, polymer, or plastic. Thus, stabilizers for a synthetic rubber are not presumed to be stabilizers for other polymers in the absence of extensive experimentation. Similarly, compounds which may be added to a given polymer and which confer stabilization against the deteriorative effect of ultraweight light may have little or no effect in inhibiting thermal oxidation. The converse is true in that compounds which are excellent inhibitors of thermal oxidation may be of little or no benefit in stabilizing against deterioration by ultraviolet light.

The stabilizers must not only be effective, but also must have certain properties. For instance, they should be compatible with the polymer and compounding ingredients in effective amounts, and they are preferably non-migratory, or do not result in blooming or exudation. They of course must resist weathering. They should be colorless or aesthetically pleasing, have a stable color when subjected to heat or light, and if colored, should be non-fading. Of further importance is that the additive compounds should be non-destructive of, or should enhance, desirable polymer properties such as electrical properties, adhesiveness or non-adhesiveness, and so forth. Toxicity and odor or lack thereof are desirable depending upon utility, e.g., in products subject to biological attack or subject to insect or rodent damage, or products which come into contact with comestibles or living tissue.

One object of the present invention is the provision of stabilized compositions in which one or more of the changes mentioned heretofore, but not necessarily all of such changes, are prevented or inhibited by the utilization of said stabilizing materials.

It is another object of this invention to provide new poly-α-olefin compositions having enhanced resistance to degradation by environmental conditions, particularly to degradation by ultraviolet light, weathering, and conditions encountered during manufacturing processes, and to provide stabilized articles and methods for their preparation.

Another object of the invention is to provide a polyolefin composition and particularly polypropylene, polyethylene, or copolymers thereof, having a high resistance to degradation by long term ultraviolet radiation, and articles formed thereof, having a stable appearance or color.

A further object of the invention is to provide a stabilizer composition useful for stabilizing one or more polyolefins against deterioration, particularly that connected with exposure to ultraviolet radiation.

Yet another object of this invention is to provide stabilized poly-α-olefins such as polypropylene, polyethylene, and copolymers thereof, in which a plurality of stabilizing compounds are used which exert a synergistic stabilizing effect, that is, the stabilizing effect of the combination of stabilizers is greater than would be expected from the effect given by individual compounds used alone.

The poly-α-olefins which are stabilized against deterioration according to the invention are preferably solid plastics, such as polyethylene, polypropylene, polybutene-1, copolymers thereof and the like. In general, any of the polymers of α-monoolefins having from 2 to about 20 carbon atoms are useful in accordance with the invention. Such other poly-α-olefins include normally solid homopolymers and copolymers of isobutylene, pentene-1, 2-methylbutene-1, 3-methylbutene-1, hexene-1, heptene-1, octene-1, nonene-1, decene-1, 4-methylheptene-1, 6-ethylheptene-1, octadecene-1, sylrene, butadiene, isoprene, allylbenzene and the like, and copolymers of or with ethylene and/or propylene.

It will be understood that in some instances the poly-α-olefin is modified by blending with other polymers in smaller amounts and reference herein to poly-α-olefins is intended to include such blends. The polymers include any of the commercially available materials such as the low density and high density polyolefins, the so-called amorphous and crystalline polyolefins, and the polyolefins designated by the terminology isotactic and atactic. Polyolefins having a density of between about .9 and 1.0 are suitable, including low density products having a density of about .9–.93, medium density products having a density of about .93–.95, and high density products having a density of about .95–.97. Preferably the polyolefin is prepared by one of the well-known high pressure or low-pressure processes and has a high degree of crystallinity, that is, low heptane solubility. Reference is made to Fawcett et al. U.S. Patent 2,153,553, granted Apr. 11, 1935, and to the applications of Coover, U.S. Ser. No. 559,536, filed Jan. 17, 1956, and Coover, et al. U.S. Ser. No. 724,904, filed Mar. 31, 1958, both now abandoned, to Belgian Patent 538,789, to Scientific American, September 1957, at p. 98, to Cash U.S. Patent No. 2,912,424, and Hagemeyer U.S. Patent No. 2,917,500 for suitable polyolefins and methods for their preparation.

The molecular weight of the polyolefin is above about 9,000, and normally above 20,000 and up to 300,000 or more. In addition, it is preferable that the melt flow is above 0.1 for the reason that a polyolefin product having a lower melt flow is difficult to fabricate into useful products without degradation of the polymer. Also, a melt flow below 400 is preferred because a polyolefin having a higher melt flow lacks the toughness required for most products.

The invention, as to copolymers, includes stabilization and compounding of random copolymers of ethylene, propylene, and other α-olefins as defined herein, as well as of substantially crystalline (substantially insoluble in boiling hexane) or stereoregular block copolymers of propylene and/or ethylene with one another or other α-olefins. These crystalline or stereoregular copolymers are sometimes called "Polyallomers," but their description does not necessarily require the use of this term. The crystalline or stereoregular block copolymers preferably are predominantly (60% to 99% by weight) of segments or blocks of homopolymeric propylene or and/or ethylene and which may contain homopolymeric blocks of other α-olefins. Examples are crystalline or stereoregular block copolymers of propylene (e.g. 80–99% by weight) and ethylene (e.g. 1–20% by weight); propylene with butene-1; ethylene with hexene-1; 4-methylpentene-1 with butene-1; propylene with butene-1; propylene with 1,1,4,4-tetramethyl-1,3-butadiene; and propylene with isoprene. Of course, the invention includes blends of such crystalline block copolymers with homopolymers, such as polyethylene and polypropylene. Incorporated herein by reference are British Patents 993,752, 1,018,283, 1,018,284, and 1,009,718, disclosing methods of preparing such substantially crystalline or stereoregular block copolymers.

The useful hydroxybenzotriazoles have the formula.

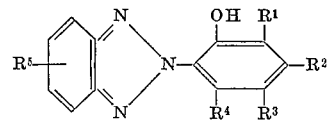

wherein $R^1$, $R^2$, $R^3$, $R^4$, and $R^5$ are, independently H, OH, $NO_2$, halogen, $CF_3$, or an alkyl or alkoxy radical having from 1 to about 18 carbon atoms.

Suitable alkyl radicals include straight chain or branched chain alkyl radicals, preferably having from 1 to about 18 carbon atoms. Examples of hydrocarbyl radicals useful according to the invention are methyl, ethyl, propyl, tertiary butyl, octyl, tertiary amyl, isononyl, dodecyl, octadecyl, tetradecyl, pentadecyl, 1,1,3,3-tetramethylbutyl, and 2,2-dimethylhexyl.

Suitable alkoxy radicals include methoxy, ethoxy, tert-butyloxy, hexyloxy, heptyloxy, octyloxy, nonyloxy; 2-ethylhexyloxy, and dodecyloxy, and other with alkyl groups given above. Examples of suitable compounds and methods for their preparation are given in U.S. Patents Nos. 3,074,910, 3,004,896, and 3,211,696.

Other examples of specific useful 2(2′-hydroxyphenyl) benzotriazole derivatives are the following:

I.

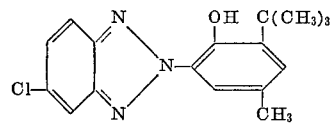

5-chloro-2(2′-hydroxy-3′-tert-butyl-5′-methylphenyl)-2H-benzotriazole

II

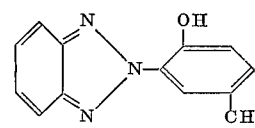

2(2′-hydroxy-5′-methylphenyl)benzotriazole

III

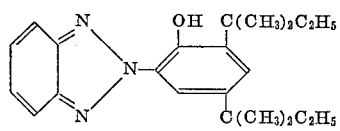

2(2′-hydroxy-3′,5′-di-tert.-amylphenyl)-2H benzotriazole

IV

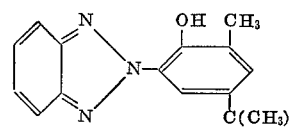

2(2′-hydroxy-3′-methyl-5′-tert-butylphenyl)-2H benzotriazole

V

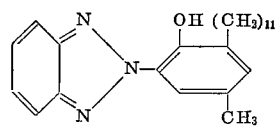

2(2′-hydroxy-3′-dodecyl-5′-methylphenyl)-2H benzotriazole

VI

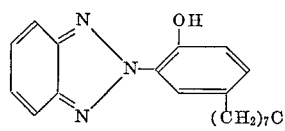

2(2′-hydroxy-5′-n-octyl-phenyl)-2H benzotriazole

The nickel moiety in the compounds used in the synergistic combination of stabilizers is divalent. Suitable types of compounds are salts of inorganic acids and of organic acids such as the carboxylic acids, including the amino acids, the oxide, salts of amines, and the hydroxide. Examples of compounds of inorganic acids are nickel nitrate, nickel carbonate, nickel chloride, nickel fluoride, nickel cyanide, nickel sulfate, and nickel sulfide. Suitable organic acids are the carboxylic acids, representative salts being nickel acetate, nickel stearate, nickel formate, nickel oleate, nickel propionate, nickel caprylate, nickel lactate, nickel citrate, nickel benzoate, nickel salicylate, nickel alkyl phenyl salicylates as shown in U.S. Patent No. 3,196,128, and nickel naphthenate. Nickel salts of other organic acids, such as α-aminocarboxylic acids, are also useful, examples being the nickel salts of glycine, alanine, and N-carboxymethyl piperidine (see U.S. Patent No. 3,102,107 for other examples).

The benzotriazole and the nickel compound may be added separately to the polyolefin.

As may be seen from the examples, all combinations of the nickel compounds and benzotriazole derivatives are synergistic for some of the polyolefins. It is also to be noted that the particular polymer selected dictates whether broad classes of nickel compounds and benzotriazoles are beneficial, whether a broad class of one type of stabilizer is useful with a narrow class of the other, or whether narrow classes of types of compounds are useful.

For polypropylene, substantially any of the 2'-hydroxyphenyl benzotriazole derivatives with substantially any nickel compound, i.e., salts of carboxylic acids, nickel carbonate, nickel halides, and nickel hydroxide showed a synergistic effect, the only exceptions being nickelous nitrate, nickel hypophosphite, and nickel oxide. Nickel stearate is particularly effective.

When the polymer is polyethylene, and the benzotriazole is 5-chloro-2(2'-hydroxy-3'-tert-butyl - 5'-methylphenyl)-2H benzotriazole only nickel formate gave a synergistic effect, whereas with 2(2' - hydroxy - 3',5' - ditert-amylphenyl)-2H benzotriazole, synergistic stabilizing combinations were found with nickelous nitrate, nickel stearate, nickel oleate or nickel hypophosphite. The combination, for polyethylene, of 5-chloro-2(2'-hydroxy-5'-methylphenyl)-2H benzotriazole and nickel acetate also gave a synergistic stabilizing action.

The random copolymer of α-olefins was found to be stabilized synergistically with a combination of 2(2'-hydroxy-3' - tert.-butyl-5' - methylphenyl)-2H benzotriazole and nickel stearate or nickel hypophosphite, or with a combination of 2(2'-hydroxy-3',5'-ditert-amylphenyl)-2H benzotriazole and nickel stearate or nickel carbonate.

When the crystalline, stereoregular α-olefin block copolymer is stabilized, all combinations of benzotriazoles and nickel compounds utilized gave a synergistic effect. Thus, 0.5% of each additive gave a stability life at least as great as would be expected in utilizing 1% of each additive.

The proportion by weight of each of the stabilizers, based on the weight of the polymer, is suitably between about .05% and 10% and more preferably in the range of about 0.1% to about 5%. The preferred weight ratio of benzotriazole derivatives to nickel compound is between 1:10 and 10:1. The quantities are preferably within the limits of compatibility. The stabilizers are added by conventional methods, including blending with a polymer powder prior to fabrication, incorporating the additives in a melt of the polymer, milling on heated rolls, and blending the polymer and additives in solution in suitable organic solvents known to the art.

The product is useful when fabricated into films in the order of 0.2 to 10 mils in thickness, bristles for brushes, fibers, laminates with or coatings on paper or cardboard, conduits, kitchenware, metal coatings, and other known products. The products are of particular utility where the fabricated article is subject to weathering as hereinbefore defined, and for outdoor use.

The following examples represent suitable modes of carrying out the invention, and it is to be understood the invention is not limited thereto except insofar as required by the appended claims.

EXAMPLE 1

The ultraviolet stabilizer 5-chloro-2(2'-hydroxy-3'-tert-butyl-5'-methylphenyl)-2H benzotriazole was dissolved in methyl ethyl ketone and added to a solution of nickel acetate hydrate in ethanol. The concentration of the two compounds was such that when combined they would be in a mole ratio of 2 moles of the benzotriazole derivative to 1 mole nickel acetate. The combined solution was allowed to evaporate while stirring at room temperature and the dry, blended material recovered. This material was added to polypropylene containing an antioxidant mixture of 0.1% BHT (2,6-ditertiary butyl-4-methylphenol) plus 0.1% dilauryl 3,3'-thiodipropionate by compounding for 5 min. on a C. W. Brabender Plastograph at 375° F. under an inert atmosphere. Compositions were also compounded wherein each component of the mixture, i.e., the benzotriazole derivative and nickel acetate was added to the polypropylene singly in the Plastograph.

The resultant Plastograph slabs were granulated and injection molded into tensile bars 2.5-in. long by 0.5-in. wide at the end and having a gauge section 1 in. by 0.25 in. The tensile specimens were then bent into a U and inserted upside down in a ⅝-in. wide channel. The channel containing the stressed specimens was then exposed to weathering in an Atlas Twin-Arc Weather-Ometer modified with 10 Westinghouse 20 watt fluorescent sunlamps, [Anal. Chem. 25, 460 (1953)]. The stress-crack life of the specimens was determined as the exposure hours required to develop cracks, visible under 3X magnification, in the stressed specimens. Color observations were made prior to the exposure and during exposure by visually comparing samples with a respective unexposed sample. The results of the weathering tests are summarized in Table 1.

Polypropylene having an inherent viscosity of 1.6, a density of 0.911, a melt flow of 4.2 g./10 min. at 230° C. and with a 2160 g. load, and a heptane index of 93%, was used.

TABLE 1

| Additive at 1% concn. level | Weather-Ometer stress-crack life, hr. | Color |
| --- | --- | --- |
| (1) None | 90 | None. |
| (2) 5-chloro-2(2'-hydroxy-3'-tert:butyl-5'-methyl-phenyl)-2H benzotriazole. | 1,500 | Lt. yellow transparent. |
| (3) Nickel acetate | 160 | Green, translucent. |
| (4) 2:1 5-chloro-2-(2'-hydroxy-3'-tert-buty-5'-methyl-phenyl)-2H-benzotriazole: Nickel acetate mixture. | 2,650 | V. pale green, transparent. |

The mixture of the benzotriazole derivative and nickel acetate produced a very pale green transparent composition having better stability to weathering than the sum stability of the individual components. This composiion was found to neither increase or decrease in color on exposure to ultraviolet radiation; hence, exhibiting exceptional stability.

EXAMPLE 2

In this example a number of benzotriazole derivatives were mixed with a number of nickel compounds and tested for weathering stability.

Polypropylene of inherent viscosity 1.6 and having incorporated into it an antioxidant mixture of 0.1% Tenox BHT plus 0.1% dilauryl 3,3'-thiodipropionate was mixed with the additives to be evaluated in the Plastograph as described in Example 1. In this example the additives were added directly to the polypropylene in the Plastograph instead of being premixed as described in Example 1. The polypropylene was the same as that used in Example 1. Additives were incorporated in the polypropylene both as single components and as mixtures. Weathering tests were conducted in the Weather-Ometer as described in Example 1. The results of the tests and the compositions tested are summarized in Table 2.

hours are considered synergistic. In addition to the mixtures of benzotriazoles and nickel stearate, the mixtures with a number of other nickel salts were made although nickel hypophosphite was unstable at the compounding temperature required for polypropylene. With this exception, all the nickel salts were satisfactory.

TABLE 2.—WEATHERING OF POLYPROPYLENE

| First additive | Concn., percent | Second additive | Concn., percent | Weather-Ometer stress-crack life, hr. Found | Weather-Ometer stress-crack life, hr. Expected | Color of composition |
|---|---|---|---|---|---|---|
| (1) None | | None | | 90 | | None. |
| (2) 5-chloro-2(2'-hydroxy-3'-tert-butyl-5'-methyl-phenyl)-2H benzotriazole. | 1.0 | do | | 1,500 | | Lt. yellow. |
| (3) 2-(2'-hydroxy-5'-methyl phenyl)-2H benzotriazole. | 1.0 | do | | 580 | | Do. |
| (4) 2-(2'-hydroxy-3',5'-di-tert-amyl phenyl)-2H benzotriazole. | 1.0 | do | | 700 | | None. |
| (5) 2-(2'-hydroxy-3'-methyl-5'-tert-butyl phenyl)-2H benzotriazole. | 1.0 | do | | 500 | | Lt. yellow. |
| (6) 2-(2'-hydroxy-3'-dodecyl-5'-methyl phenyl)-2H benzotriazole. | 1.0 | do | | 650 | | Lt. brown. |
| (7) 2-(2'-hydroxy-5'-n-octyl phenyl)-2H benzotriazole. | 1.0 | do | | 540 | | None. |
| (8) 2,4,6-tris(o-hydroxy phenyl)-1,3,5-triazine. | 1.0 | do | | 930 | | Yellow. |
| (9) Nickel chelate with 2,2'-thiobis-p-tert-octylphenol (Ferro AM-101). | 1.0 | do | | 340 | | Lt. green. |
| (10) None | | Nickel stearate | 1.0 | 130 | | Do. |
| (11) 5-chloro-2-(2'-hydroxy-3'-tert-butyl-5'-methyl phenyl)-2H benzotriazole. | 0.9 | do | 0.9 | 3,040 | 1,540 | Do. |
| (12) 5-chloro-2-(2'-hydroxy-3'-tert-butyl-5'-methyl phenyl)-2H benzotriazole. | 0.5 | do | 1.0 | 2,530 | 1,070 | Do. |
| (13) 2(2'-hydroxy-5'-methylphenyl)-2H benzotriazole. | 0.9 | do | 1.2 | 1,663 | 620 | Green opaque. |
| (14) 2-(2'-hydroxy-3'-5'-di-tert-amylphenyl)-2H benzotriazole. | 1.0 | do | 0.8 | 1,990 | 740 | Purple. |
| (15) 2-(2'-hydroxy-3'-methyl-5'-tert-butylphenyl)-2H benzotriazole. | 1.0 | do | 1.0 | 2,390 | 540 | Green. |
| (16) 2-(2'-hydroxy-3'-dodecyl-5'-methyl phenyl)-2H benzotriazole. | 1.0 | do | 1.0 | 3,420 | 690 | Do. |
| (17) 2'(2'-hydroxy-5'-n-octylphenyl)-2H benzotriazole. | 1.0 | do | 0.7 | 3,420 | 970 | Yellow-green. |
| (18) 2,4,6-tris(o-hydroxy-phenyl)-1,3,5-triazine. | .26 | do | 1.3 | 460 | | Yellow. |
| (19) 2,4,6-tris(o-hydroxy-phenyl)-1,3,5-triazine. | .60 | do | .8 | 390 | | Do. |
| (20) None | | Nickel acetate | 1.0 | 94 | | Green. |
| (21) None | | Nickelous carbonate | 1.0 | 94 | | Yellow-green. |
| (22) None | | Nickel formate | 1.0 | 94 | | Green. |
| (23) None | | Nickelous chloride | 1.0 | 94 | | Yellow. |
| (24) None | | Nickelous nitrate | 1.0 | 94 | | Do. |
| (25) None | | Nickel hypophosphite | 1.0 | 94 | | Do. |
| (26) None | | Nickel hydroxide | 1.0 | 94 | | Green. |
| (27) None | | Nickel oxide | 1.0 | 94 | | Black. |
| (28) None | | Nickel oleate | 1.0 | 94 | | Dark green. |
| (29) 5-chloro-2(2'-hydroxy-3'-tert-butyl-5'-methylphenyl)-2H benzotriazole. | 0.5 | None | | 1,030 | | Lt. yellow. |
| (30) 5-chloro-2(2'-hydroxy-3'-tert-butyl-5'-methylphenyl)-2H benzotriazole. | 0.5 | Nickel acetate | 0.5 | 1,340 | 1,030 | Yellow-green. |
| (31) 5-chloro-2(2'-hydroxy-3'-tert-butyl-5'-methylphenyl)-2H benzotriazole. | 0.5 | Nickelous carbonate | 0.5 | 1,430 | 1,034 | Yellow. |
| (32) 5-chloro-2(2'-hydroxy-3'-tert-butyl-5'-methylphenyl)-2H benzotriazole. | 0.5 | Nickel formate | 0.5 | 1,430 | 1,034 | Lt. green. |
| (33) 5-chloro-2(2'-hydroxy-3'-tert-butyl-5'-methylphenyl)-2H benzotriazole. | 0.5 | Nickelous chloride | 0.5 | 1,430 | 1,034 | Yellow. |
| (34) 5-chloro-2(2'-hydroxy-3'-tert-butyl-5'-methylphenyl)-2H benzotriazole. | 0.5 | Nickelous nitrate | 0.5 | 400 | 1,034 | Brown. |
| (35) 5-chloro-2(2'-hydroxy-3'-tert-butyl-5'-methylphenyl)-2H benzotriazole. | 0.5 | Nickel hypophosphite | 0.5 | 795 | 1,034 | Black. |
| (36) 5-chloro-2(2'-hydroxy-3'-tert-butyl-5'-methylphenyl)-2H benzotriazole. | 0.5 | Nickel hydroxide | 0.5 | 1,390 | 1,034 | Lt. yellow. |
| (37) 5-chloro-2(2'-hydroxy-3'-tert-butyl-5'-methylphenyl)-2H benzotriazole. | 0.5 | Nickel oleate | 0.5 | 1,245 | 1,034 | Yellow. |
| (38) 5-chloro-2(2'-hydroxy-3'-tert-butyl-5'-methylphenyl)-2H benzotriazole. | 0.5 | Nickel oxide | 0.5 | 1,030 | 1,034 | Black. |

It is obvious from Table 2 that the mixtures of benzotriazoles and nickel stearate added directly to molten polymer during compounding produce similar results to those obtained when the benzotriazole and nickle acetate were premixed and then added to the polypropylene. The weathering stability obtained with mixtures of benzotriazoles and nickel salts was outstandingly good. Whereas, none of the benzotriazoles, excluding 5 - chloro - 2(2'-hydroxy-3-tert-butyl-3-methylphenyl)-2H benzotriazole, when used alone exceeded a stress-crack life of 700 hours, the combinations of the benzotriazoles with nickel stearate have all withstood 1200 hours of exposure without failure. Nickel stearate alone at 1% concentration level contributed only 40 hours to the stress-crack life; hence, the combinations of benzotriazoles and nickel stearate which have exceeded the stress-crack lifetime of 740 hours are considered synergistic.

EXAMPLE 3

Polyethylene of melt index 2 was mixed with the additives to be evaluated by milling on hot compounding rolls for 4 min. The front roll was held at 270° F. and the rear roll held at 220° F. The roll slabs were compression molded into flat plates 0.125-in. thick. Specimens 1½ x ½-in. were cut from the plates, bent into a U and inserted upside down in an aluminum channel ⅜-in. deep and ½-in. wide. The channel was exposed in the Weather-Ometer described in Example 1 and the stress-crack life of the specimens was measured as the exposure hours necessary to develop cracks, visible under 3X magnification, in the surface of the stressed specimens. The polyethylene utilized had a mlet index of 2 (ASTM D1238-52T), a molecular weight of 30,000, and a specific gravity of 0.92. The additives tested and weathering results obtained to date are summarized in Table 3.

TABLE 3.—WEATHERING OF POLYETHYLENE

| First additive | Concn., phr. | Second additive | Concn., phr. | Weather-Omerter Stress-Crack Life, Hr. Found | Weather-Omerter Stress-Crack Life, Hr. Expected | Composition color |
|---|---|---|---|---|---|---|
| (1) None | | None | | 220 | | None. |
| (2) 5-chloro-2(2'-hydroxy-3'-tert-butyl-5'-methylphenyl)-2H benzotriazole. | 1.0 | do | | 1,123 | | Lt. yellow. |
| (3) 5-chloro-2(2'-hydroxy-3'-ter.butyl-5'-methylphenyl)-2H benzotriazole. | 0.5 | do | | 610 | | Do. |
| (4) 2-(2'-hydroxy-3',5'-di-tert-amylphenyl)-2H benzotriazole. | 1.0 | do | | 712 | | None. |
| (5) 2-(2'-hydroxy-3',5'-di-tert-amylphenyl)-2H benzotriazole. | 0.5 | do | | 490 | | Do. |
| (6) 2-(2'-hydroxy-5'-methylphenyl)-2H benzotriazole | 1.0 | do | | 450 | | Do. |
| (7) 2-(2'-hydroxy-5'-methylphenyl)-2H benzotriazole | 0.5 | do | | 280 | | Do. |
| (8) 2-(2'-hydroxy-5'-n-octylphenyl)-2H benzotriazole | 0.5 | do | | 640 | | Do. |
| (9) 2-(2'-hydroxy-5'-n-octylphenyl)-2H benzotriazole | 0.5 | do | | 450 | | Do. |
| (10) None | | Nickel acetate | 1.0 | 220 | | Lt. green. |
| (11) None | | Nickelous carbonate | 1.0 | 220 | | Green. |
| (12) None | | Nickel formate | 1.0 | 220 | | Lt. blue-green. |
| (13) None | | Nickelous chloride | 1.0 | 220 | | Yellow. |
| (14) None | | Nickelous nitrate | 1.0 | 220 | | Lt. yellow-green. |
| (15) None | | Nickelous oleate | 1.0 | 220 | | Lt. yellow. |
| (16) None | | Nickel stearate | 1.0 | 220 | | Do. |
| (17) None | | Nickel hypophosphite | 1.0 | 220 | | Do. |
| (18) 5-chloro-2(2'-hydroxy-3'-tert-butyl-5'-methylphenyl)-2H benzotriazole. | 0.5 | Nickel acetate | 0.5 | 610 | 610 | V. lt. green. |
| (19) 5-chloro-2(2'-hydroxy-3'-tert-butyl-5'-methylphenyl)-2H benzotriazole. | 0.5 | Nickel carbonate | 0.5 | 610 | 610 | Yellow. |
| (20) 5-chloro-2(2'-hydroxy-3'-tert-butyl-5'-methylphenyl)-2H benzotriazole. | 0.5 | Nickel formate | 0.5 | 1,245 | 610 | Lt. green. |
| (21) 5-chloro-2(2'-hydroxy-3'-tert-butyl-5'-methylphenyl)-2H benzotriazole. | 0.5 | Nickelous chloride | 0.5 | 490 | 610 | Lt. yellow. |
| (22) 5-chloro-2(2'-hydroxy-3'-tert-butyl-5'-methylphenyl)-2H benzotriazole. | 0.5 | Nickel oleate | 0.5 | 490 | 610 | Do. |
| (23) 5-chloro-2(2'-hydroxy-3'-tert-butyl-5'-methylphenyl)-2H benzotriazole. | 0.5 | Nickel stearate | 0.5 | 490 | 610 | Do. |
| (24) 5-chloro-2-(2'-hydroxy-3'-tert-butyl-5'-methylphenyl)-2H benzotriazole. | 0.5 | Nickel hypophosphite | 0.5 | 490 | 610 | Do. |
| (25) 2-(2'-hydroxy-3',5'-di-tert-amylphenyl)-2H benzotriazole. | 0.5 | Nickel acetate | 0.5 | 490 | 490 | Do. |
| (26) 2-(2'-hydroxy-3',5'-di-tert-amylphenyl)-2H benzotriazole. | 0.5 | Nickelous carbonate | 0.5 | 490 | 490 | Yellow. |
| (27) 2-(2'-hydroxy-3',5'-di-tert-amylphenyl)-2H benzotriazole. | 0.5 | Nickelous nitrate | 0.5 | 1,245 | 490 | Brown. |
| (28) 2-(2'-hydroxy-3',5'-di-tert-amylphenyl)-2H benzotriazole. | 0.5 | Nickel formate | 0.5 | 610 | 490 | Lt. blue-green. |
| (29) 2-(2'-hydroxy-3',5'-di-tert-amylphenyl)-2H benzotriazole. | 0.5 | Nickel stearate | 9.5 | 610 | 490 | Lt. yellow. |
| (30) 2-(2'-hydroxy-3',5'-di-tert-amylphenyl)-2H benzotriazole. | 0.5 | Nickel oleate | 0.5 | 610 | 490 | Do. |
| (31) 2-(2'-hydroxy-3',5'-di-tert-amylphenyl)-6H benzotriazole. | 0.5 | Nickel hypophosphite | 0.5 | 610 | 490 | Do. |
| (32) 2-(2'-hydroxy-5'-methylphenyl)-2H benzotriazole | 0.5 | Nickel acetate | 0.5 | 400 | 280 | Yellow-green. |
| (33) 2-(2'-hydroxy-'-methylphenyl)-2H benzotriazole | 0.5 | Nickel formate | 0.5 | 280 | 280 | Do. |
| (34) 2-(6'-hydroxy-5'-methylphenyl)-6H benzotriazole | 0.5 | Nickelous carbonate | 0.5 | 280 | 280 | Do. |
| (35) 2-(6'-hydroxy-5'-n-octylphenyl)-6H benzotriazole | 0.5 | Nickel stearate | 0.5 | 280 | 450 | Yellow. |

As will be noted from the foregoing table, only certain combinations of benzotriazoles and nickel salts were synergistic. There are the compositions Number 20 and 27–32 inclusive.

EXAMPLE 4

A copolymer of 15% 1-butene, 85% propylene having a melt flow of 4.0 dg./min. was mixed with the additives to be evaluated by hot-roll compounding. "Melt flow" as used herein is a modification of melt index (ASTM D1238) in which a load of 2.16 kg. is used at 230° C. The stabilization data for these compositions are given in the following Table 4.

TABLE 4.—WEATHERING OF POLYOLEFIN COPOLYMER

| First additive | Concn. percent | Second additive | Concn. percent | Weather-Omerter stress-crack life, hr. Found | Weather-Omerter stress-crack life, hr. Expected | Composition color |
|---|---|---|---|---|---|---|
| (1) None | | None | | 165 | | None. |
| (2) 5-chloro-2-(2'hydroxy-3'-tert-butyl-5'-methyl-phenyl)-2H benzotriazole. | 1.0 | do | | 470 | | Lt. brown. |
| (3) 2(2'-hydroxy-5'-methyl-phenyl)-2H benzotriazole | 1.0 | do | | 400 | | Do. |
| (4) 2-(2'-hydroxy-3',5'-di-tert-amylphenyl)-2K benzotriazole | 1.0 | do | | 470 | | None. |
| (5) 2-(2'hydroxy-5'-n-octylphenyl)-2H benzotriazole | 1.0 | do | | 470 | | Lt. brown. |
| (6) None | | Nickel acetate | 1.0 | 280 | | Green. |
| (7) None | | Nickel stearate | 1.0 | 165 | | Lt. yellow. |
| (8) None | | Nickel carbonate | 1.0 | 280 | | Green. |
| (9) None | | Nickel hypophosphite | 1.0 | 165 | | Yellow. |
| (10) None | | Nickel formate | 1.0 | 165 | | Green. |
| (11) 5-chloro-2(2'-hydroxy-3'-tert-butyl-5'-methylphenyl)-2H benzotriazole | 0.5 | Nickel acetate | 0.5 | 320 | 485 | Lt. yellow-green. |
| (12) 5-chloro-2(2'-hydroxy-3'-tert-butyl-5,-methylphenyl)-2H benzotriazole. | 0.5 | Nickel stearate | 0.5 | 1,980 | 470 | Lt. brown. |
| (13) 5-chloro-2(2'-hydroxy-3'-tert-butyl-5'-methylphenyl)-2H benzotriazole. | 0.5 | Nickel hypophosphite | 0.5 | 1,245 | 470 | Yellow. |
| (14) 2-(2'-hydroxy-3',5'-di-tert-amylphenyl)-2H benzotriazole | 0.5 | Nickel acetate | 0.5 | 320 | 485 | Lt. green. |
| (15) 2-(2'-hydroxy-3',5'-di-tert-amylphenyl)-2H benzotriazole | 0.5 | Nickel stearate | 0.5 | 1,450 | 470 | Lt. brown. |
| (16) 2-(2'-hydroxy-3',5'-di-tert-amylphenyl)-2H benzotriazole | 0.5 | Nickel hypophosphite | 0.5 | 320 | 470 | Lt. yellow. |
| (17) 2-(2'-hydroxy-3',5'-di-tert.amylphenyl)-2H benzotrizzole | 0.5 | Nickel formate | 0.5 | 320 | 470 | Lt. green. |
| (18) 2-(2'-hydroxy-3',5'-di-tert-amylphenyl)-2H benzotriazole | 0.5 | Nickel carbonate | 0.5 | 1,030 | 485 | Green. |
| (19) Eastman Inhibitor DOBP, 4-dodecyloxy-2-hydroxy-benzophenone. | 1.0 | None | | 400 | | Lt. brown. |
| (20) Eastman Inhibitor OPS, p-octylphenyl salicylate | 1.0 | do | | 400 | | None. |

As the weathering tests in Table 4 illustrate, few of the combinations of stabilizers gave a synergistic stabilizing effect with the polymer of this example.

EXAMPLE 5

A propylene-ethylene polyallomer containing about 0.5% copolymerized ethylene was mixed with the additives to be evaluated by hot-roll compounding. Flat plates 0.125-in. thick were compression molded at 375° F. and 3000 p.s.i. Specimens 1.5 x 0.5 in. were cut from the plates and exposed in the Weather-Ometer as described in Example 3. The compositions are listed in Table 5. The processing temperature was somewhat higher in the case of the polyallomer than for the propylene-butene copolymer. At the temperature required to mold the polyallomer all the nickel salts were found to be stable except the nickel hypophosphite. It thus appears that application of this nickel salt is restricted to polymers which are processed below 375° F. None of the compositions in this or the other examples faded or otherwise changed in color.

(3) 2(2'-hydroxy-5'-methylphenyl)-2H- benzotriazole in combination with nickel acetate;

the weight ratio of the substituted hydroxy benzotriazole to the divalent nickel compound being in the range of 0.05/10 to 10/0.05.

2. A composition according to claim 1 wherein the stabilizer combination is 5-chloro-2(2'-hydroxy-3'-tert-butyl-5'-methylphenyl)-2H benzotriazole in combination with nickel formate.

3. A composition according to claim 1 wherein the stabilizer combination is 2-(2'-hydroxy-3',5'-di-tert-amylphenyl)-2H benzotriazole in combination with nickelous nitrate.

4. A composition according to claim 1 wherein the weight ratio of the substituted hydroxy benzotriazole to the divalent nickel compound is in the range of 1/10 to 10/1.

TABLE 5.—WEATHERING OF POLYALLOMER

| First additive | Concn., percent | Second additive | Concn., percent | Weather-Ometer stress-crack life, hr. Found | Weather-Ometer stress-crack life, hr. Expected | Composition color |
|---|---|---|---|---|---|---|
| (1) None | | None | | 400 | | None. |
| (2) 5-chloro-2-(2'-hydroxy-3'-tert-butyl-5'-methylphenyl)-2H benzotriazole. | 1.0 | do | | 1,650 | | Lt. yellow. |
| (3) 2-(2'-hydroxy-3',5'-di-tert-amylphenyl)-2H benzotriazole. | 1.0 | do | | 1,890 | | Do. |
| (4) 2(2'-hydroxy-3'-methyl-phenyl)-2H benzotriazole | 1.0 | do | | 1,030 | | Do. |
| (5) None | | Nickel acetate | 1.0 | 400 | | Green. |
| (6) None | | Nickel carbonate | 1.0 | 610 | | Do. |
| (7) None | | Nickel stearate | 1.0 | 400 | | Do. |
| (8) None | | Nickel hypohosphite | 1.0 | 400 | | Black. |
| (9) 5-chloro-2-(2'-hydroxy-3'-tert-butyl-5'-methylphenyl)-2H benzotriazole. | 0.5 | Nickel acetate | 0.5 | 2,500 | 1,650 | Lt. yellow-green. |
| (10) 5-chloro-2-(2'-hydroxy-3'-tert-butyl-5'-methylphenyl)-2H benzotriazole. | 0.5 | Nickel carbonate | 0.5 | 2,500 | 1,860 | Yellow. |
| (11) 5-chloro-2-(2-hydroxy-3'-tert-butyl-5'-methylphenyl)-2H benzotriazole. | 0.5 | Nickel steaate | 0.5 | 3,550 | 1,650 | Lt. yellow. |
| (12) 5-chloro-2-(2'-hydroxy-3'-tert-butyl-5'-methylphenyl)-2H benzotriazole. | 0.5 | Nickel hypophosphite | 0.5 | 3,000 | 1,650 | Black. |
| (13) 2-(2'-hydroxy-3',5-di-tert-amyl-phenyl)-2H benzotriazole. | 0.5 | Nickel acetate | 0.5 | 2,710 | 1,890 | Lt. yellow-green. |
| (14) 2-(2'-hydroxy-3'-,5'di-tert-amyl-phenyl)-2H benzotriazole. | 0.5 | Nickel carbonate | 0.5 | 2,710 | 2,100 | Do. |
| (15) 2-(2'-hydroxy-3',5'-di-tert-amyl-phenyl)-2H benzotriazole. | 0.5 | Nickel stearate | 0.5 | 2,830 | 1,890 | Do. |
| (16) 2-(2'-hydroxy-3',5'-di-tert-amyl-phenyl)-2H benzotriazole. | 0.5 | Nickel hypophosphite | 0.5 | 2,250 | 1,890 | Black. |
| (17) 2(2'-hydroxy-3'-methylphenyl)-2H benzotriazole | 0.5 | Nickel acetate | 0.5 | 1,240 | 1,030 | Yellow. |
| (18) 2-(2'-hydroxy-3'-methylphenyl)-2H benzotriazole | 0.5 | Nickel carbonate | 0.5 | 1,240 | 1,240 | Yellow-green. |
| (19) 2-(2'-hydroxy-3'-methylphenyl)-2H benzotriazole | 0.5 | Nickel strearate | 0.5 | 2,100 | 1,030 | Yellow. |
| (20) 2-(2'-hydroxy-3'-methylphenyl)-2H benzotriazole | 0.5 | Nickel hypophosphite | 0.5 | 1,240 | 1,030 | Black. |
| (21) Eastman Inhibitor DOBP | 1.0 | None | | 1,890 | | None. |
| (22) Eastman Inhibitor OPS | 1.0 | do | | 1,550 | | Do. |

We claim:

1. A composition comprising:
   (A) polyethylene, and
   (B) a stabilizing amount of a substituted hydroxy benzotriazole/divalent nickel compound stabilizer combination which is
   (1) 5 - chloro-2(2'-hydroxy-3'-tert-butyl-5'-methylphenyl)-2H benzotriazole in combination with nickel formate;
   (2) 2(2'-hydroxy - 3',5' - di-tert-amylphenyl)-2H-benzotriazole in combination with nickelous nitrate, nickel formate, nickel stearate, nickel oleate, or nickel hypophosphite; or

References Cited

UNITED STATES PATENTS

| | | | |
|---|---|---|---|
| 3,074,909 | 1/1963 | Matlack | 260—45.75 |
| 3,074,910 | 1/1963 | Dickson | 260—45.75 |
| 3,240,552 | 3/1966 | Joyner et al. | 8—39 |
| 3,284,387 | 11/1966 | Cantatore et al. | 260—23 |
| 3,310,510 | 3/1967 | Breslow | 260—23 |
| 3,312,658 | 4/1967 | Kamijo et al. | 260—45.75 |

DONALD E. CZAJA, Primary Examiner

R. A. WHITE, Assistant Examiner

U.S. Cl. X.R.

260—45.75, 45.8